US008478479B2

(12) United States Patent
Ghelam

(10) Patent No.: US 8,478,479 B2
(45) Date of Patent: Jul. 2, 2013

(54) PREDICTING TIME TO MAINTENANCE BY FUSION BETWEEN MODELING AND SIMULATION FOR ELECTRONIC EQUIPMENT ON BOARD AN AIRCRAFT

(75) Inventor: Samir Ghelam, Marseilles (FR)

(73) Assignee: Eurocopter, Marignane Cedex (FR)

( * ) Notice: Subject to any disclaimer, the term of this patent is extended or adjusted under 35 U.S.C. 154(b) by 31 days.

(21) Appl. No.: 13/343,031

(22) Filed: Jan. 4, 2012

(65) Prior Publication Data

US 2012/0179326 A1 Jul. 12, 2012

(30) Foreign Application Priority Data

Jan. 6, 2011 (FR) ...................................... 11 00030

(51) Int. Cl.
*G01M 17/00* (2006.01)
(52) U.S. Cl.
USPC ............ 701/31.9; 702/34; 702/182; 702/183
(58) Field of Classification Search
CPC .................................................... B64F 5/0045
USPC ........................................................ 701/31.9
See application file for complete search history.

(56) References Cited

U.S. PATENT DOCUMENTS

| 5,239,468 | A | 8/1993 | Sewersky |
| 5,719,675 | A | 2/1998 | Killpatrick |
| 6,246,341 | B1 | 6/2001 | Germanetti |
| 6,941,204 | B2 | 9/2005 | Halm |
| 7,050,894 | B2 | 5/2006 | Halm |
| 7,457,785 | B1 | 11/2008 | Greitzer |
| 7,474,989 | B1 | 1/2009 | Wilcoxon |
| 7,684,936 | B2 * | 3/2010 | Bechhoefer ..................... 702/34 |
| 7,882,394 | B2 | 2/2011 | Hosek |
| 8,175,818 | B2 | 5/2012 | Foucher |
| 2002/0107589 | A1 | 8/2002 | Grimm |
| 2004/0153800 | A1 | 8/2004 | Germanetti |
| 2004/0176887 | A1 | 9/2004 | Kent |
| 2008/0244326 | A1 * | 10/2008 | Basu .............................. 714/40 |
| 2010/0100337 | A1 * | 4/2010 | Vichare et al. .................. 702/34 |

FOREIGN PATENT DOCUMENTS

| CA | 2055566 A1 | 6/1992 |
| EP | 0407179 A1 | 1/1991 |
| EP | 1455313 A1 | 9/2004 |
| FR | 2676556 A1 | 11/1992 |
| FR | 2778766 A1 | 11/1999 |

(Continued)

OTHER PUBLICATIONS

ARINC Report. 8.0 Airplane Condition Monitoring System. p. 54, chapters 8.2.1-8.2.2 Revised Aug. 30, 1993.

(Continued)

*Primary Examiner* — Khoi Tran
*Assistant Examiner* — Ryan Rink
(74) *Attorney, Agent, or Firm* — Brooks Kushman P.C.

(57) ABSTRACT

A method and system for predictive maintenance of electronic equipment on board an aircraft (1). To produce a prognosis, the following are provided: a step (48) of modeling the equipment (3) with a model (53) for damage by an external aggression; a step (49) of simulating the damage up to failure; a learning step (64); a step (65) of classifying calculated and normalized values; and a fusion step (61) giving the real prognosis of the time to maintenance in units of time. The invention applies in particular to a rotary wing aircraft (1), e.g. a helicopter drone.

10 Claims, 6 Drawing Sheets

FOREIGN PATENT DOCUMENTS

| | | |
|---|---|---|
| FR | 2841352 A1 | 12/2003 |
| WO | 0218879 A1 | 3/2002 |
| WO | 2007008940 A2 | 1/2007 |
| WO | 2007085756 A2 | 8/2007 |

OTHER PUBLICATIONS

A review of uncertainty in flight vehicle structural damage monitoring, diagnosis and control: Challenges and opportunities. Lopez, Progress in Aerospace Sciences. vol. 46 No. 7, ISSN: 0376-0421. Oct. 5, 2010.

Revue Internationale sur l'Ingenierie des Risques Industriels. International Review on Industrial Risk Engineering, vol. 1, No. 2. Published 2008.

Maintenance preddictive appliquee aux systemes electroniques embarques, 2005.

Search Report and Written Opinion; Application No. FR 1100030; dated Sep. 13, 2011.

\* cited by examiner

Fig.6
| (Tm̄) | (ΔT) | | | | | | | | | | |
|---|---|---|---|---|---|---|---|---|---|---|---|
| | 30°C | 45°C | 60°C | 75°C | 90°C | 105°C | 120°C | 135°C | 150°C | 165°C | 180°C |
| -30°C | 65535 | 39168 | 16612 | 9819 | 5950 | 3906 | 2713 | 1967 | 1475 | 1138 | 898 |
| -15°C | 65535 | 31163 | 13907 | 7906 | 4842 | 3201 | 2238 | 1633 | 1232 | 955 | 757 |
| 0°C | 65535 | 25190 | 11250 | 6023 | 3760 | 2511 | 1775 | 1307 | 995 | 777 | 621 |
| 15°C | 49567 | 17730 | 9037 | 5102 | 3194 | 2146 | 1524 | 1126 | 860 | 674 | 540 |
| 30°C | 40401 | 14123 | 6753 | 3994 | 2538 | 1725 | 1237 | 922 | 710 | 560 | 452 |
| 45°C | 29554 | 10830 | 5545 | 3152 | 2027 | 1396 | 1011 | 760 | 590 | 469 | 380 |
| 60°C | 22776 | 8687 | 4380 | 2365 | 1562 | 1094 | 804 | 612 | 480 | 385 | 315 |
| 75°C | 15086 | 5724 | 3299 | 1844 | 1243 | 884 | 657 | 506 | 401 | 324 | 267 |
| 90°C | 14345 | 5694 | 2972 | 1792 | 1186 | 837 | 619 | 474 | 374 | 302 | 248 |
| 105°C | 10254 | 4192 | 2300 | 1389 | 940 | 675 | 505 | 393 | 312 | 254 | 210 |
| 120°C | 9301 | 3069 | 2076 | 1270 | 861 | 616 | 461 | 358 | 285 | 232 | 192 |
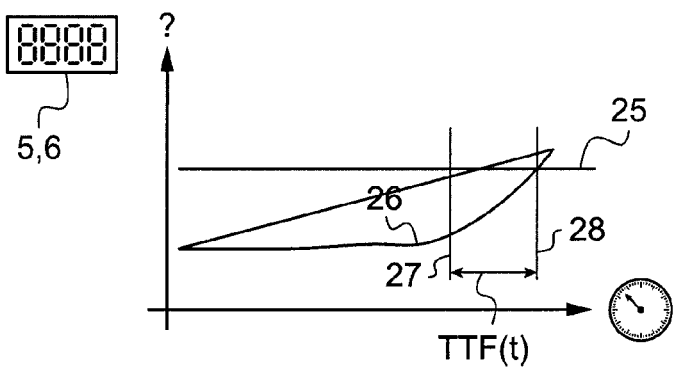
Fig.7
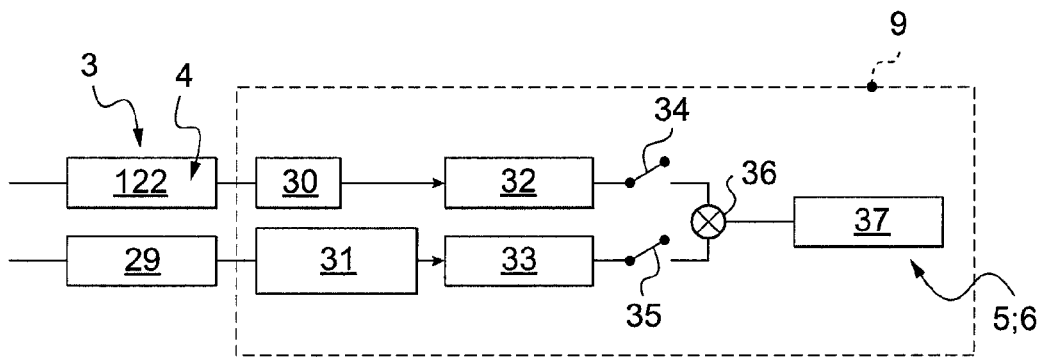
Fig.8

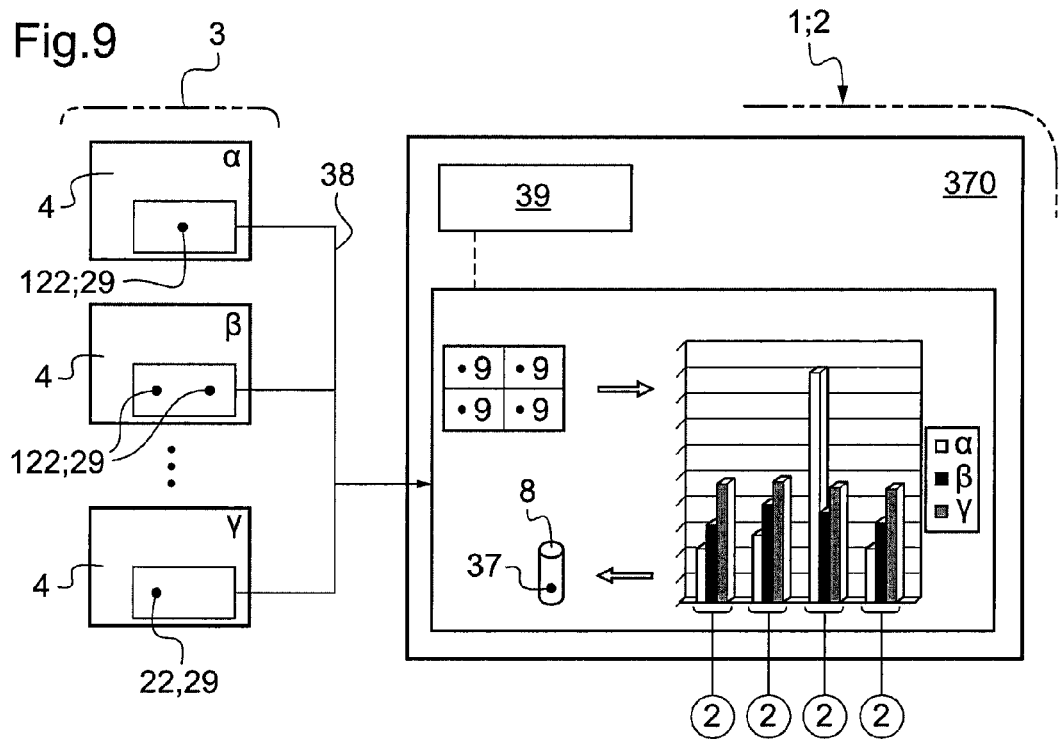
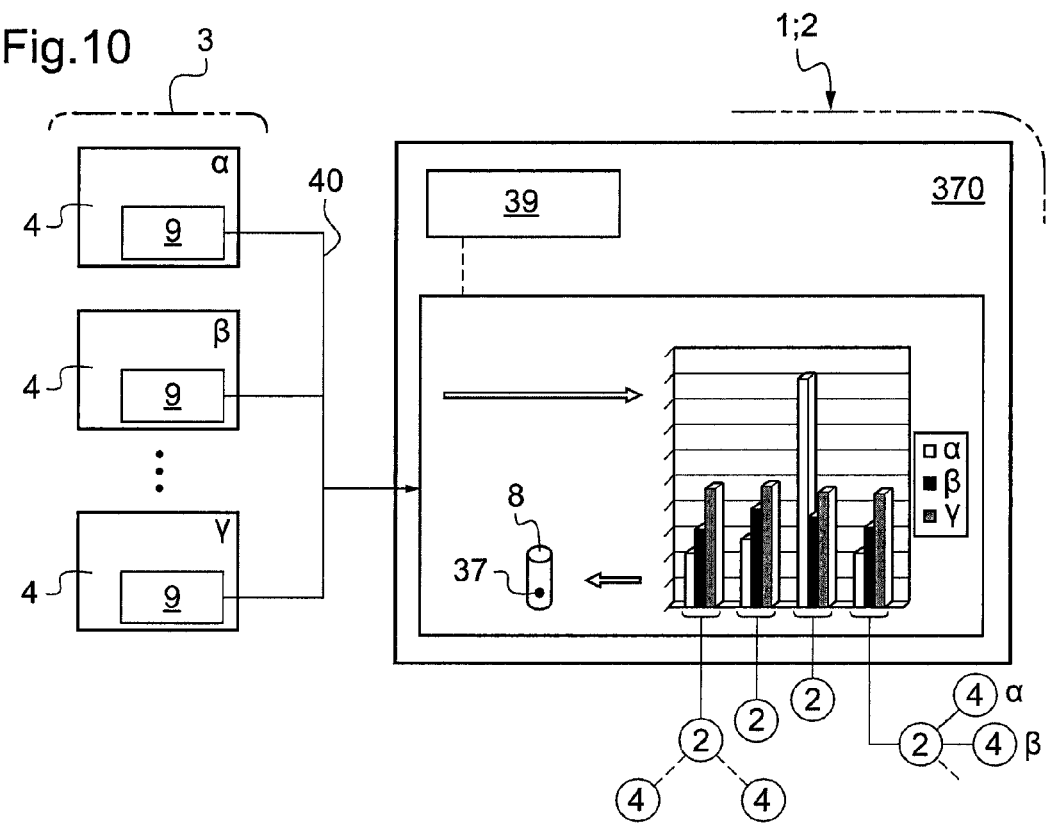

PREDICTING TIME TO MAINTENANCE BY FUSION BETWEEN MODELING AND SIMULATION FOR ELECTRONIC EQUIPMENT ON BOARD AN AIRCRAFT

CROSS REFERENCE TO RELATED APPLICATIONS

This application claims priority to French patent application FR 11/00030 filed on Jan. 6, 2011, the disclosure of which is incorporated in its entirety by reference herein.

BACKGROUND OF THE INVENTION (1) Field of the Invention

The invention relates to the field of aviation. In particular, it applies to monitoring the operating and maintenance state of an aircraft, for maintenance purposes. More precisely, the invention relates to maintenance of the electronics on board an aircraft.

(2) Description of Related Art

On-board electronics is integrated in particular in avionics systems. By way of example, these may be an autopilot system, a navigation system, a health and usage monitoring system (HUMS), or indeed communications systems.

Such avionics systems comprise various pieces of on-board electronic equipment, which are referred to as line replaceable units (LRUs).

These pieces of equipment or LRUs are made up of various parts, components, or modules (e.g. an electronics card and on-board software) referred to as shop replaceable units (SRUs).

Particularly in aviation, maintenance is crucial. It involves in particular inspecting, revising, and repairing aircraft. This is essential in terms of reliability and safety.

In terms of cost, a non-negligible portion of the cost of operating an aircraft is associated with its maintenance. Maintenance also has a major influence on the operating availability of an aircraft, and thus on its profitability.

It can be understood that there is conflict between optimizing the planning of maintenance operations on an aircraft and the cost thereof. It is therefore difficult to improve the availability of an aircraft, to propose novel maintenance concepts, and also to guarantee the required level of safety.

Thus, there is conflict between the safety of making a replacement earlier than the predefined end-of-life of a component, and maximizing operating efficiency of that component by putting off maintenance for as long as possible.

The actual lifetime remaining for a given component varies depending on its operating conditions. At present, a predefined "service life" is calculated for a component, specifying a standardized length of time it can operate, expressed either as a number of operating cycles or else in units of time (typically hours).

Service life is predefined when the component is produced, and/or by standards or regulations, on the basis of empirical data, of calculated estimates, and of draconian safety margins.

The concept of a predefined "service life" should be distinguished from the concept of time to failure (TTF) which designates the effective or real maximum length of time that remains for such a component or piece of on-board electronic equipment. TTF is evaluated starting from the predefined service life. TTF is found to be satisfactory from a safety point of view, but it remains too approximate for maintenance prognosis.

Concerning time to failure, another term that is sometimes used is "remaining lifetime" or "cycles to failure" (CTF).

The predefined "service life" is identical for all components that are identical and it is predetermined. In contrast, the TTF is directly dependent on the actual number of cycles or length of operating time applicable to the component in question. It is relatively independent of the operating environment and conditions that apply thereto.

It can be understood that two components having identical predefined service lives do not necessarily have the same actual cycles or time to failure (CTF/TTF). For example, one of the components might be used under extremely difficult conditions (short lifetime), while the other is used under favorable conditions (longer lifetime).

As a result, it would appear useful to be able to have an indicator representing the tracking of the state of health and wear of pieces of equipment, expressed in terms of time to failure $TTF(t)$, i.e. expressed in units of time.

In present practice, maintenance is thus performed only at predefined and/or regulatory time intervals, or on reaching usage values (numbers of cycles, . . . ). Maintenance also takes place in the event of a failure. This is particularly true for avionics systems, i.e. the sets of on-board electronic equipment.

As a result, the operator of an aircraft runs a risk of an unpredictable interruption of a mission. Under certain circumstances, such as aircraft for lifesaving or military missions, that is sometimes unacceptable.

To illustrate the above, we mention the 1993 specification document ARINC624-1 (in particular page 54, chapters 8.2.1 & 8.2.2) which describes research recommendations for maintaining avionics systems.

For present avionics systems that comply with the ARINC624 specification, the decision on whether or not to perform maintenance rests mainly on the results from built-in test equipment (BITE). The test provides a functional state of the LRU of the avionics system, in particular in the event of failure, with this being expressed in the form of a "NO GO" code prohibiting flight. Depending on the failure, a calculation unit may generate a functional alarm to inform the pilot.

It can be understood that in practice, it is not presently possible to have better than a binary evaluation of the instantaneous state of a piece of equipment. Either it is in working order because it is before the end of its predetermined service life, or else the equipment has reached this service life limit or has been found faulty in a test, in which case it is indicated as being not fit for use.

As a result, it is not possible at present to anticipate a failure, i.e. the moment at which it is likely to appear, nor is it possible to forecast the resources that will need to be implemented in future maintenance, nor indeed to define with sufficient certainty the future periods for which the aircraft will be available for operation. Consequently, an aircraft runs the risk of not being available for use in the event of an emergency, e.g. merely because at the time inspections were made prior to flight it was not possible to predict the failure of a piece of on-board electronic equipment that is close to the end of its TTF.

It can be seen that at present it is not common practice in aviation for maintenance concerning on-board electronic equipment to be predictive or preventative. An object of the invention is to provide predictive maintenance for on-board electronic equipment that is capable of making evaluations regularly, or even in real time, concerning the state of the various components or modules of certain pieces of on-board electronic equipment, thereby determining in real time the time they have to failure $TTF(t)$ expressed in units of time.

Preventative or predictive maintenance in accordance with the invention would make it possible in particular to achieve two results that differ from the present state of the art, namely:

for pieces of on-board electronic equipment, it would enable failure to be forecast (as opposed to merely determining that the aircraft should be grounded "NO GO"); and from a practical point of view, such preventative maintenance cannot be made accurate, reliable, and safe without appropriately taking into consideration the physics of failures and the classification of real measurements performed on the equipment/component under consideration.

That said, there are known predictive methods that are said to be "model" based, and other known predictive methods that are distinct therefrom and that operate by simulation, which methods are said to be "signal" based, and are applicable to fatigue, in particular.

Among the numerous model-based methods, specific tools are theoretically available that have recourse to the physics of failure.

Among the numerous signal-based methods, specific tools are available that have recourse to classifying signals, to neural networks, and to neuro-fuzzy logic.

In practice, model-based methods and signal-based methods are distinct and they are not combined. It can thus be seen that the invention brings together and combines in appropriate, novel, and meaningful manner a variety of sources of data that already exist on board or that are produced specifically and then made compatible.

At this point, mention is made of various documents relating to the field of maintenance and to evaluating damage.

Document WO 2007/085756 describes real time monitoring of the consumed lifetime of a system that may be an electronics card in the field of aviation. In operation, sensors send measurements in the form of signals that are understood by a microprocessor. Depending on the maximum acceptable movement profile and on the maximum acceptable stress profile for the system, the results of simulation are fed to a memory that contains a matrix of failure cycles.

Algorithms serve to calculate the fatigue of the system in real time. Consumed life time may be calculated on the number of life cycles or on a number of cycles to failure in order to make it possible also to integrate results obtained by finite element simulations, analytic simulations, or experimental tests.

That document also describes evaluating consumed lifetime (as a percentage and not in time units) by summing damage. This amounts to calculating a remaining lifetime indicator with a "raw" measurement that is subsequently simplified, a first stage of modeling damage to the system, and then a fairly basic second stage of estimating said lifetime.

Document XP 027218802, Lopez, describes various present techniques for monitoring structural damage to a vehicle, in particular to an airliner. In order to take into consideration impossibilities, wrong diagnoses, and inaccurate prognoses, mathematical and statistical methods are used to analyze those uncertainties on the basis of various tool boxes, including fuzzy logic, simulation measures, statistics, and probabilities.

The document (Article4_Paper_Ciri2007_Revue_JH3.pdf) from "Revue Internationale sur l'Ingénierie des Risques Industriels" [International Review on Industrial Risk Engineering], Vol. 1, No. 2 (2008), entitled "Crédit de maintenance, de la surveillance des pièces méchaniques d'un aéronef de la maintenance dynamique" [Maintenance credit, from monitoring mechanical parts of an aircraft to dynamic maintenance] mentions in Chapter 3.3 a "maintenance credit function", the notion of "accumulated damage" and "updating calculation of time before overhaul (TBO)", and the fact that indicators calculated during the first phase of treatment of the raw data are used as input to certain calculation models and has recourse to fuzzy logic, also known as "fusion".

The document (Pentom07_Samir.pdf) "PENTOM 2005" entitled "Maintenance prédictive appliquée aux systèmes électroniques embarqués" [Predictive maintenance applied to on-board electronic systems] draws a distinction between two approaches that are distinct and separate in order to implement the predictive maintenance function, namely an exclusively "model-based" approach or an exclusively "signal-based" approach, which approaches do not make use of the same models and require different capture means. Mention may be made of: http://hal.archives-ouvertes.fr/docs00/18/54/97/PDF/Pento m07 Samir.pdf Document CA 2 055 566 describes an automated helicopter maintenance monitoring system. Data is collected from a plurality of sensors, representative of vibration, rotor blade balancing, rotor phase, and mode of flight. This data is used to define when helicopter failure has occurred or is going to occur. The object is to limit excessive vibration without involving an excessive number of test hours, in particular in order to avoid cracking in a planet gear support on a UH-60A aircraft. Software implements various kinds of processing on the basis of the captured data and predefined fatigue thresholds.

Document EP 0 407 179 describes systems for monitoring the use and the operating state of a helicopter, without making provision for real-time analysis of the risks of on-board electronics equipment failing.

Document EP 1 455 313 describes an aircraft condition analysis management system (ACAMS) (ARINC). Physical parameters (temperature, vibration, etc.) are used, together with flight parameters, performance parameters, and autotest data for the purpose of monitoring mechanical or structural components of the aircraft.

Document FR 2 676 556 describes providing maintenance assistance for an industrial process, using two processors in which the more complex second processor is guided by information produced by the first processor in order to select a monitoring plan as a function of the state of said industrial process.

Document FR 2 778 766 describes providing maintenance assistance for a helicopter. Maintenance information is selectively delivered to a monitoring and pilot-viewing system.

Document FR 2 841 352 describes displaying maintenance data on a screen for viewing by the pilot of a helicopter, which data is listed and accessible from outside the helicopter via interfaces.

Document U.S. Pat. No. 5,719,675 describes predicting the remaining lifetime of a navigation laser gyro as a function of acquired performance parameters.

Documents U.S. Pat. No. 6,941,204 and U.S. Pat. No. 7,050,894 describe airliner diagnosis for the purpose of facilitating repairs, with a receiver for bringing up to the airplane on the ground so as to enable it to transmit maintenance-assistance information without making contact.

Document U.S. Pat. No. 7,474,989 describes predicting failures of an electronic assembly on the basis of lifetime consumption and environment monitoring. Environment sensors (in situ sensors) are coupled from a logical point of view to a sacrificial sensor. Values for temperature, vibration, corrosion, humidity, impedance, and voltage are measured for this purpose. Correlation and a correction loop are provided in order to form a prediction message.

Document US 2002/0107589 describes determining parameters that describe changes within a technical system as a result of aging. Performance quantities that depend on the use of the technical system are applied to a model of wear and tear so as to derive therefrom a remaining lifetime in terms of service.

Document WO 02/18879 describes predicting a remaining service life on the basis of signals from detectors (electrical current, voltage, capacitance, inductance). Detection takes place in real time and may be applied to maintenance, for various structures including an electronic device, e.g. for use in an aircraft.

Document WO 2007/008940 describes intelligent diagnosis of fault monitoring for predictive maintenance. An analysis layer makes use of numerous layered treatments including threshold rules, neural networks, Fourier transforms, etc., and also dynamic models.

Document WO 2007/085756 describes monitoring an environmental magnitude in real time on the basis of signals from measurement sensors that are subsequently filtered.

From the above, it can be understood that in spite of a large amount of research, prognosis is not available in practice in aviation for use with on-board electronic equipment and capable of taking advantage of a combination of methods (modeling plus simulation, analysis of signals (both from simulation and from operation), and then fusing compatible data), making use of common resources and implementing a novel and inventive classification of the indicators as produced in this way so as to be capable, in real time, of providing a reliable estimate of the remaining lifetime (given in units of time, e.g. hours, minutes, or seconds) for said equipment.

BRIEF SUMMARY OF THE INVENTION

The invention makes use (for simulation and/or operation) of internal signal data in a form that is compatible with electronic logic, representative of physical parameters of external stresses (vibration, temperature, humidity, chemical aggression, . . . ) relating to aggressions to which its electronic components have been subjected. The invention also makes use of internal signals that, if suitably selected, are genuinely representative of the instantaneous state of health of the electronic components of a piece of equipment, e.g. a drain current or a light intensity emitted by an optocoupler.

Thus, operating histories, flight parameters, performance parameters, and autotest data, or indeed a signal that is internal to the aircraft (e.g. of the type including drain current or light intensity emitted by an optocoupler) can be treated within a maintenance prognosis method so as to make the method predictive.

The novel combination of the invention uses said methods in combination in complementary manner. It makes it possible to refine the diagnosis of remaining lifetime for electronic equipment and to make it more reliable, and it enables advantage to be taken of work concerning analysis of physical damage to electronic equipment as carried out by aircraft manufacturers and their equipment suppliers.

Prototypes and testing of the invention have thus made available, in practice and in real time, a reliable prognosis of time to maintenance, which prognosis is available and updated throughout all of the stages of operation of the aircraft.

This prognosis of the invention concerning the remaining lifetime of a piece of equipment relies on an appropriate fusion between modeling and simulation.

To this end, the invention is defined by the claims.

In an example, the invention provides a method of providing a prognosis of the mean time to failure in units of time for at least one piece of electronic equipment on board an aircraft. The equipment possesses a plurality of components.

Throughout a life cycle of the equipment, the method comprises the following steps:

a modeling step of modeling the equipment, this modeling step providing at least: a phase of parameterizing an aggression external to said equipment, and defining at least one physical parameter representative of said external aggression as a function of time; and a phase of producing a damage model of the damage to the equipment due to said external aggression;

a damage simulation step of simulating the damage to the equipment caused by repeated aggression in operation represented at least by said physical parameter, up to at least one failure state; said damage simulation step comprising at least one stage of measuring values of said physical parameter during the repeated aggression, said measured values being integrated in said definition of said at least one physical parameter; and a stage of selecting at least one critical component within the equipment;

a data collection step of collecting data specific to the damage to the equipment from said damage model and from measured values of said physical parameter in operation of the equipment;

a learning step, said learning step providing at least: a phase of selecting at least one internal signal $V_i(t)$ of the equipment, said signal being determined as revealing a failure state of said at least one critical component; a phase of capturing operating data of the equipment; and a phase of generating a correlation function between said operating data and values of said internal signal of said critical component of said equipment;

a classification step of classifying said internal signal values and said operating data; said classification step including a phase of calculating and standardizing data representative of real distances to failure;

a fusion step of fusing said data specific to damage and said data representative of real distances to failure once normalized, in order to obtain a real prognosis of the time to failure in units of time before maintenance; and a step of making available said real prognosis of time to failure in units of time of the on-board electronic equipment.

In an implementation, the collection step groups together data specific to unit amounts of damage for each physical parameter in application of a damage superposition rule.

In an implementation, the collection step provides:
processing to identify a cycle;
processing to read a number of cycles from a matrix coming from the modeling step; and
processing to add unit amounts of damage using equation:

$$\sum_j \frac{n_j}{N_j}$$

where: $n_j$ designates the repetition number of a cycle constituting a source of damage to which the equipment has been subjected, and $N_j$ designates a predetermined number of repetitions of said damage-source cycle capable of leading to a failure state.

In an implementation, the learning step determines a failure threshold $V_{i_{max}}$ for each internal signal $V_i(t)$ of said equipment.

In an implementation, the method provides for the classification step to determine data representative of real distances to failure $$\frac{V_i(t)}{V_{imax}}$$

for each internal signal $V_i(t)$ of said equipment as a function of an instantaneous value of said internal signal and of said determined threshold.

In an implementation, the fusion step calculates said time to maintenance in the form of a mean time to failure TTF(t) given in units of time from the equation:

$$TTF(T) = \frac{1 - \alpha_1 \sum_i \frac{V_i(T)}{V_{imax}} - \alpha_2 \sum_j \frac{n_j}{N_j}}{\alpha_1 \sum_i \frac{V_i(T)}{V_{imax}} + \alpha_2 \sum_j \frac{n_j}{N_j}} \times T$$

where $\alpha_1$ and $\alpha_2$ are two constant coefficients having a sum of 1.

In an implementation, during the parameterizing phase, the method provides for defining at least one physical parameter representative of an external aggression on said equipment as a function of time, which parameter takes account at least of one level of vibration to which the equipment is subjected.

The invention also provides an avionics system including at least one on-board piece of electronic equipment that implements the above-mentioned method.

The equipment possesses at least one sentinel device suitable in particular for performing real time calculation of a time to failure in units of time. The sentinel device is connected to at least one probe of the aircraft that is suitable for measuring internal signals within at least one component of said equipment.

In an embodiment, the avionics system includes within at least one piece of equipment at least one sentinel device that participates in the real time calculation of a time to failure in units of time, and it possesses a printed circuit carrying at least:
a microcontroller;
connections to the microcontroller;
a sensor in the form of an accelerometer;
at least one other sensor for measuring external signals; and
a digital display.

In the sentinel device, the sensors thus measure signals internal to the equipment to which it belongs.

The invention also provides an aircraft of the type designed to implement the above-mentioned method. In an embodiment, the aircraft is a rotary wing aircraft.

BRIEF DESCRIPTION OF THE SEVERAL VIEWS OF THE DRAWINGS

The invention and its advantages appear in greater detail from the following description that shows an implementation of the invention, given without any limiting character and with reference to the accompanying figures, in which:

FIG. 6 shows an example of a display of a matrix of estimated damage for supplying a pair $(\Delta T, T)$ on each cycle, which pair corresponds to the stress measured by sensors with which it is desired to associate an unit amount of degradation; the matrix associated with the equipment gives a number "Nf" that corresponds to $(\Delta T, T)$ and (Nfi.Di=1) that corresponds to the value of the total degradation in a breakdown state; the Nf list organized in the form of "N×N" matrix being previously loaded into a microcontroller, which is associated with said sensors in the equipment for monitoring;

FIG. 7 is a graph illustrating an approach to prognosis by classifying measured signals, with values of a measured signal being plotted up the ordinate and elapsed time along the abscissa, there being shown a threshold line, a trend-tracking curve, and moments or instants of occurrence of a prognosis and of an equipment breakdown;

FIG. 8 is a diagram showing how a state of health is calculated as a function of measured signal values by a built-in health monitor (BIHM) in accordance with the invention, with sensor and probe inputs, redundant chains for prognosis by signal classification (PCSM) and combined external stresses, tracking by pre-prognosis steps each fed by a respective one of the chains, and then correlation and production of a final prognosis in accordance with the invention;

FIG. 9 is a diagram showing an example in accordance with the invention of maintenance architecture involving prognosis calculation performed in a maintenance computer (AMC) integrating signal measurement functions and connected to various equipment components (SRU) each provided with one or more measurement sensor(s) and probe(s) for transmitting measurements to said maintenance computer, also together with functions that lead to storage of results of the estimated health of said components, and by extension of the avionics equipment and/or system(s) integrating them;

FIG. 10 is similar to FIG. 9 in which the signal measurement functions are integrated in equipment components instead of being incorporated in the maintenance computer;

DETAILED DESCRIPTION OF THE INVENTION

Figure 1:
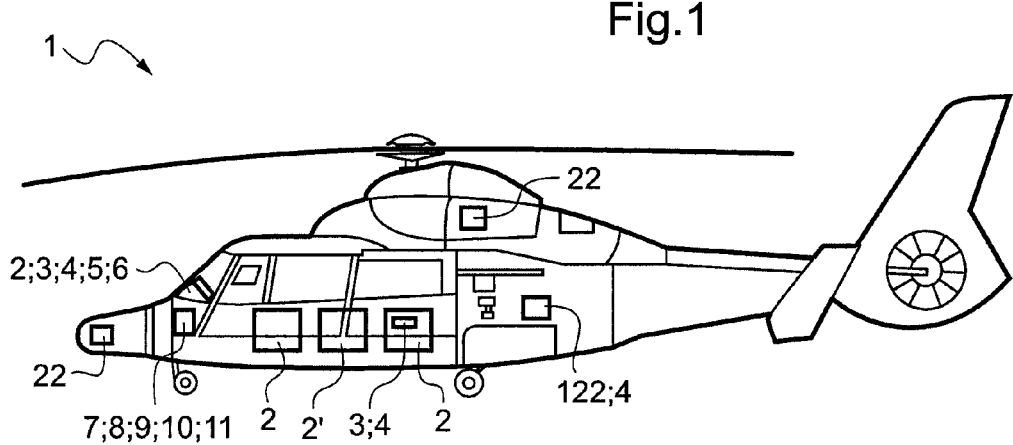
FIG. 1 is a diagrammatic side view in elevation of an aircraft in accordance with the invention, of the helicopter type, including in particular a plurality of avionics systems, each having one or more pieces of on-board electronic equipment, this equipment typically possessing one or more integrated components and/or pieces of software.

In FIG. 1 in particular, numerical reference 1 designates an aircraft. In this figure, the aircraft 1 has a rotary wing, since it is helicopter. However the invention applies to other types of aircraft, e.g. a rotorcraft, an airplane, a drone, or the like.

This aircraft 1 in accordance with the invention includes in particular a plurality of electronic avionics systems 2. Each system 2 includes one or more pieces of on-board electrical equipment (LRUs) 3. These pieces of equipment 3 typically possess one or more integrated components and/or pieces of software (SRUs) given reference 4. Below, certain other components 4 are also referenced in 22.

In particular, the aircraft 1 possesses a system 2 forming a man-machine interface 5 for piloting, which system is provided with at least one display screen 6 on board the aircraft 1.

Figure 2:
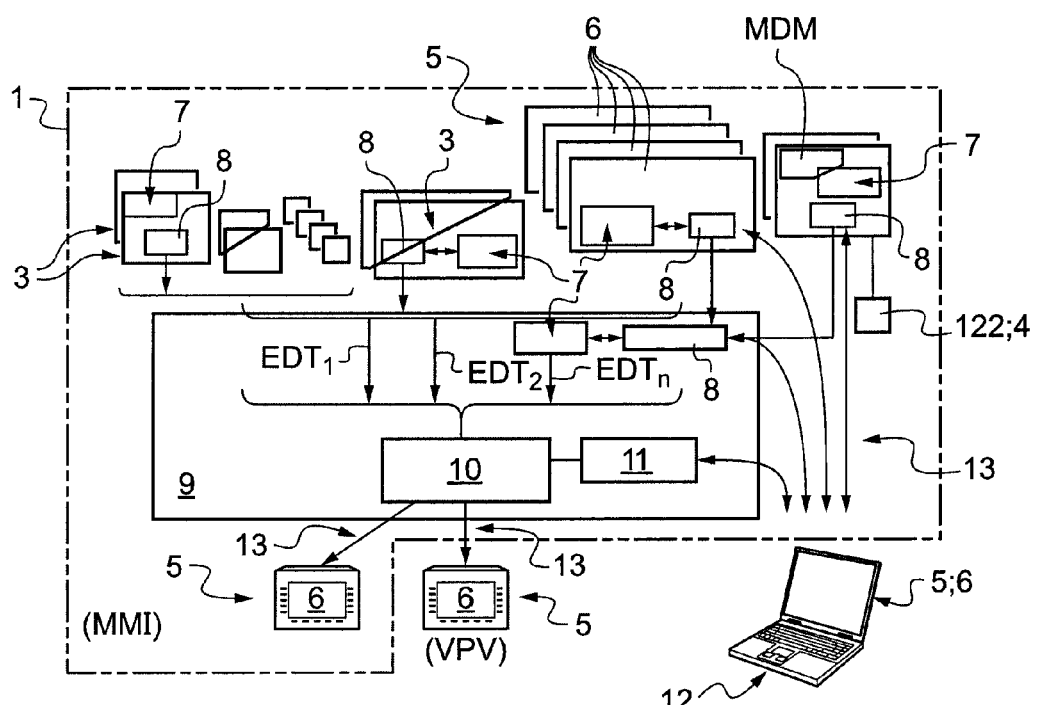
FIG. 2 is a diagrammatic view showing an example of the main structures and functional connections in a prior art implementation of the maintenance process for an ARINC624 type avionics system with component elements suitable for supplying results in the form of integrated tests of equipment.

As mentioned, FIG. 2 shows maintenance assistance for avionics systems 2 in accordance with the ARINC624 specification, in which the decision whether or not to perform maintenance relies mainly on the results of built-in test equipment (BITE). In FIG. 2, the BITE and the physical structure that operates it are given a common reference 7. As a general rule, BITE test structures 7 usually include a non-volatile memory 8, and are integrated in a piece of equipment (LRU) 3. There can be seen a plurality of man-machine interfaces (MMI) 5 with screens (VPV) 6, either in the pieces of equipment 3, or connected to a calculation unit 9 referred to as maintenance data manager (MDM). On-board MDM equipment 3 makes data available to the calculation unit 9 that is representative of the instantaneous state of the engine of the aircraft 1, shown upper right in the figure.

Various tests EDT1, EDT2, . . . , EDTn are performed by the calculation unit 9. They are grouped together in a diagnosis and time-of-occurrence table 10. In the calculation unit 9, the data from the diagnosis and time-of-occurrence table 10 is transmitted to a data centralizing unit 11. The calculation unit 9 is connected to an expert station 12 on the ground, and also to an on-board MMI 5 for feedback in flight, and also to an off-board VPV display interface 5 that enables a maintenance actor to view all of the failures that have occurred during a flight of the aircraft 1.

Each BITE 7 of a piece of equipment 3 acts in real time during a flight of the aircraft 1 to estimate the operational state of certain components 4 of the aircraft, and thus of an avionics system (LRU) 2 including it. If any of the pieces of equipment 3 in the system 2 has failed, a negative test result from the BITE (a flight-grounding NO GO code) is sent to the maintenance data centralizing unit 11 within the aircraft 1.

All of the failures together with the associated context data (time, other parameter values) are detected and stored during a flight (in particular in the table 10) and also in each piece of equipment 3 or subsystem (memories 8), after appropriate filtering.

Once the calculation unit 9 has detected a failure, it implements a predefined sequence to forward the corresponding failure code 13 to the centralizing unit 11 (or maintenance data concentrator). Depending on the failure, the calculation unit 9 might generate a functional alarm to warn the pilot.

The calculation unit 9 displays on at least one of the screens 6 the identifier of the faulty equipment 3, providing the equipment 3 has been located with a confidence level that is sufficient.

The prior art technique of FIG. 2 shows the main structures and functional connections for an ARINC624 type system 2 in which the additional expert station 12 on the ground for maintenance purposes is in the form of a portable computer connected via a wireless connection to the aircraft 1 carrying the system.

Figure 3:
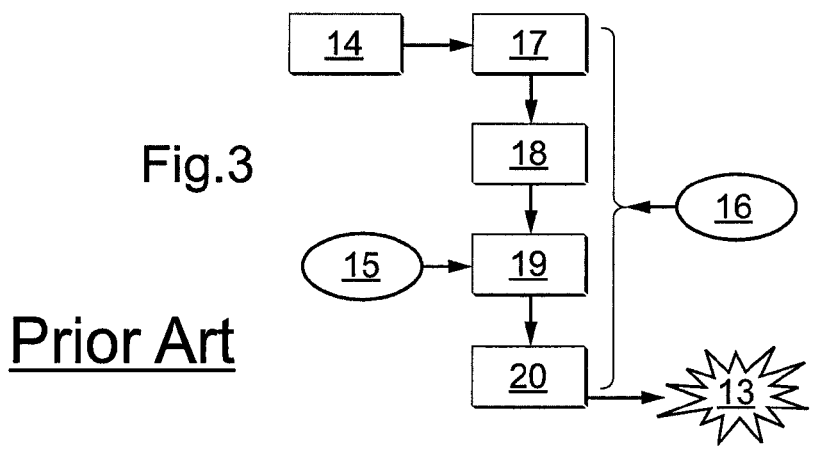
FIG. 3 is a diagrammatic view of one example of an approach to monitoring on the basis of raw data inputs about environmental stress/constraints (e.g. a measured temperature) and to making a final estimate of the value of the actual lifetime remaining for a piece of equipment.

FIG. 3 shows another prior technique of a monitoring process or approach from which the invention has been developed. Here likewise, common numerical references designate components that are similar.

This monitoring is based entirely on the physics of failure and is thus model-based, and it operates on the basis of raw data input 14 concerning environmental constraints (here a measured temperature referred to as temperature raw data), input signals 15 from first-degree models of damage to equipment 3, and second-phase estimate input signals 16 concerning a value for remaining lifetime (in number of life cycles).

Figure 4:
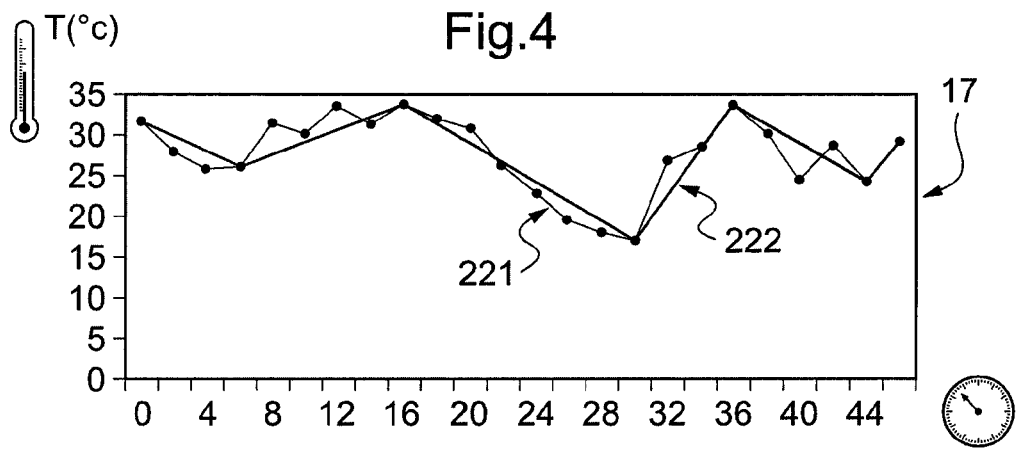
FIG. 4 is a diagram showing an example of a data simplification step with an original profile of a line plotting variation and a simplified profile as obtained by an ordered overall range (OOR) approach.
Figure 5:
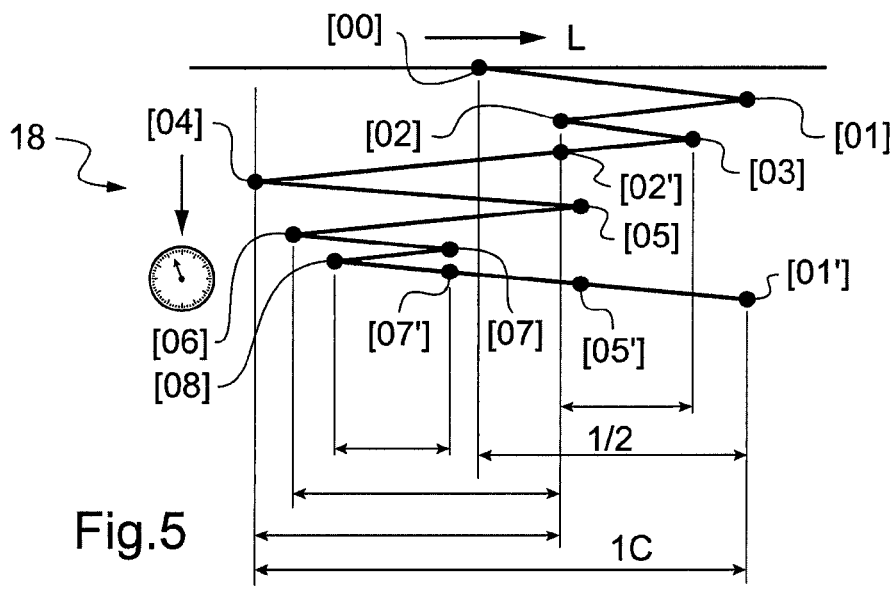
FIG. 5 is a diagram showing an example of a cycle-counting process that takes place after the simplification process, in which the useful information is converted into a number of cycles, themselves classified and characterized using two values (here a mean temperature of the cycle and the amplitude of the cycle), thereby constituting a pair "$(\Delta T, T)i$"

On the basis of the input signals 15, going from top to bottom, this process operates in the following phases:

data simplification 17 (see also FIG. 4);

counting 18 the elapsed number of life cycles (see also FIG. 5);

final damage estimation 19 involving the modeling data input in the form of a signal 15 (see FIG. 6 for how this is done in the invention); and final estimation 20 of the value of the actual remaining lifetime, typically as a number of cycles, for the piece of equipment 3, this final estimation phase 20 serving to produce a failure code 13, where appropriate.

As mentioned above, a single piece of equipment (LRU) 3 generally comprises a plurality of components (SRUs) 4.

It can be understood that the environmental constraints (such as temperature cycles, mechanical stresses, in particular vibration, chemical corrosion or moisture attack) act throughout the time a piece of equipment 3 is in use (at some appropriate rate) to give rise to unit degradations of a piece of equipment 3 and/or a component 4, and correspondingly of the system 2 to which it belongs. Such "instantaneous" information about degradations is used by the invention.

In order to make use of the monitoring process to obtain a prognosis method that is sufficiently reliable for industrial application in aviation, the invention has selected, made mutually consistent, and adapted various mathematical methods for the differing structures, steps, and phases.

Table 1 below illustrates the various mathematical methods/approaches that are theoretically applicable.

TABLE 1

THE VARIOUS APPROACHES

| | Neural networks | Physics of failure | Fusion Fuzzy logic | Physico-chemical measurements (PCSM) | Mapping | DMI | In situ sensors |
|---|---|---|---|---|---|---|---|
| Result reliability | Depends on the quantity of information collected | Does not take account of sudden events | Cf. neural networks | Depends on the pertinence of measured points | Depends on the pertinence of measured points | Does not take account of sudden events | Depends on the pertinence of measured points |
| Suitability for integration | Depends on the reliability of the result | Sentinel and result reliability | Depends on the reliability of the result | Sentinel and result reliability | Lock: camera size/observation compromise | Specific optronics | Sentinel and result reliability |
| Suitability for expressing need: prognosis | Diagnosis oriented Adapted to anticipating failures | Well adapted to anticipating failures | Diagnosis oriented Adapted to anticipating failures | Dedicated to anticipating failures | Well adapted to anticipating failures | Well adapted to anticipating failures | Dedicated to anticipating failures |
| Maturity | Mature Developed In widespread use in various sectors | Mature, applies MilHDBK FIDES | Mature | Intermediate Needs validating | Mature Developed In widespread used in various sectors | Advanced | Developed Not validated |
| Implementation difficulties/time | Depends on the quantity of information collected | Requires inputs from manufacturers | Depends on the quantity of information collected | Integration of a significant number of sensors | Difficult to integrate size/-weight | Performed by manufacturer | Easy to integrate |

The complexity of avionics systems 2 is well known, which systems form coherent and interactive assemblies made up of hardware and software having the purpose of accomplishing a determined function in independent manner. These functions are necessary for the operation of an aircraft 1, such as a helicopter, comprising: a navigation system, an autopilot system, an engine monitoring system, a mission system, a communications system, and the like.

The invention has the following exacting objectives:
prognosis that is reliable and fast, and available in situ, e.g. in flight;
a reduction in the maintenance costs of the aircraft 1;
an improvement in the availability of the aircraft 1;
novel maintenance concepts; and
an improvement in the repair and resource management processes.

It can be understood that conventional functions of monitoring pieces of equipment 3 and components 4 (sometimes referred to as subsystems), with the help of integrated tests does not suffice, in particular when, as in many present aircraft, only the following are available:

tests of functions, power supply, microprocessor, interfaces, video, etc. known as power-on BIT (PBIT): these tests are performed automatically when power is switched on and they are said to be "non-disturbing";

continuous BIT (CBIT) tests that are performed during a mission in operational mode. These tests are said to be "non-disturbing" and they verify the integrity of functions; and initiated BIT (IBIT) tests that are more thorough concerning function analysis. Existing integrated tests are triggered only after a failure has occurred or on an external command.

Present maintenance practice thus consists in waiting for a failure before intervening. This can sometimes lead to increased risks of a mission being interrupted. The new objectives seek to provide an indicator representing tracking of the state of health of on-board equipment 3, a prognosis applicable to the equipment 3 (in terms of available operating time).

As in FIG. 2, the reactions of the electronics in operation in systems 2, equipment 3, and components 4 have been observed in situations where it is desired to be able to provide a reliable and economically optimized indication concerning the time to failure TTF(t) that actually remains, with this being expressed in units of time.

On the basis of the fundamentals set out in FIGS. 2 and 3, the damage that results from the temperature and vibratory cycling to which one or more systems 2, pieces of equipment 3, and/or components 4 are subjected is taken as an example.

These cycles give rise to degradation (e.g. of electronics cards and in particular component fastenings) that generally lead to a failure. A major difficulty for a given piece of equipment 3 of component 4 then consists in interpreting input environment measurements for the purpose of calculating the degradation induced thereby as output. Work has been performed so as to enable the invention to calculate an indicator of remaining lifetime.

That work has proposed a calculation algorithm that comprises a succession of steps/phases/stages/processes providing for:
recording critical parameters by using on-board sensors;
data acquisition;
simplifying raw data (17);
extracting the number of life cycles that have already been consumed (18);
evaluating the amount of deterioration; and
TTF(t) prognosis.

The description of this prior art monitoring process (FIG. 3) is limited to studying the impact of the temperature parameter. With the invention, these capabilities need to be enlarged to other critical parameters such as vibration, electrical deterioration, and/or chemical deterioration.

With reference to FIG. 4, there can be seen an example proposed by the invention for the stage of simplifying data (comparable with phase 17). Typically, this stage participates in a modeling stage (48) with a damage model being produced (53).

In this example, data concerning the variation over time (plotted along the abscissa) in a temperature (plotted up the ordinate) gives rise to a very jagged fine line 221 that is subjected to simplification. By performing simplification, a simplified profile 222 is obtained for the line plotting variation (not very jagged, bold) as calculated by an ordered overall range (OOR) method.

With reference to FIG. 5, there can be seen an example of an approach for a stage (comparable with the phase 18) of counting the number of life cycles that have already been consumed, i.e. that have elapsed, where this is a numerical value having no physical unit. Variation in load "L" is plotted along the abscissa, while elapsed time is plotted down the ordinate.

In FIG. 5, there can be seen in diagrammatic manner an example of how consumed cycles are counted. Counting generally takes place after simplification (in the sense that the up-to-date results of the simplification (17) are needed for counting (18) in order to reach a prognosis, by comparison with (19) and then with (20)).

In this example, useful information is converted into a number of cycles (i.e. a numerical value having no physical unit). These numbers are themselves classified and characterized in pairs of values (here a mean temperature of the cycle and the amplitude of the cycle) so as to constitute a pair $(\Delta T, T)i$.

In FIG. 5, cycle counts are written in square brackets as follows: a complete cycle "1C" appears between the abscissa points [04] and [01]. Between [00] and [01] there can be seen a half cycle. All of the load limit values [00], [01], and [01'], [02] and [02'], [03], [04], [05] and [05'], [06], [07], and [08] (e.g. ¼ of a cycle between [07'] and [08] and ⅓ of a cycle between [07] and [06]) correspond to respective values in terms of cycles, generally in the form of unity (integer) or a quotient (¼; ⅓; ½).

With reference to FIG. 6, there can be seen an example of a display of a damage estimation matrix 58, e.g. as produced in a simulation step (49) comparable to the phase 19. Along the abscissa, the example of FIG. 6 gives temperature values (in ° C.). Values can be read for "$\Delta T$", i.e. the maximum difference between the minimum value measured on a cycle and the maximum value measured on that cycle.

Down the ordinate, there can be seen values for "T" or "Tm" (also written: $\overline{Tm}$) given in ° C., i.e. the average of the minimum and maximum values measured on a cycle.

This matrix 58, obtained in the simulation step 49, serves to supply each operating cycle (i.e. consumed cycle) with the values of a pair $(\Delta T, T)$ that correspond to the stress as measured by the sensors 122 (e.g. temperature sensors, see FIG. 1 or 2) with which it is desired to associate a unit amount of degradation. These values are values of a physical parameter representative of temperature aggression as a function of time.

Depending on the implementation, the invention makes use of other and/or more physical parameters representative of aggression(s) other than temperature aggression, as a function of time.

This matrix 58 of damage estimates is associated with a piece of equipment 3 by specifying a number "Nf" that corresponds to $(\Delta T, T)$ and (Nfi.Di=1), which corresponds to the value for total degradation in a failure state, i.e. reaching a complete breakdown. This value is "estimated", i.e. is supplied by a manufacturer of the equipment 3 and/or imposed by standardization, for example. The list of Nfs arranged in the form of an N×N matrix is previously loaded into a microcontroller 23 (e.g. within a sentinel device 24, cf. FIG. 11), that is incorporated together with said sensors 122 functionally associated with the equipment 3 being monitored.

At the end of the simulation step (49), after counting (18) and characterizing each cycle, it must be possible to supply a pair $(\Delta T, T)$ for each cycle, which pair corresponds to the stress as measured by the sensors 122.

This stress must be suitable for being associated with a unit amount of degradation. For this purpose (e.g. in a step 49), the number Nf is read from the matrix 58 (FIGS. 6, 12, and 13) associated with the monitored piece of equipment 3, which number corresponds to $(\Delta T, T)$. Given that Nfi cycles $(\Delta T, T)i$ leads to a failure, it is taken that the unit amount of degradation associated with the stress $(\Delta T, T)i$ is given by:

$$Di = 1/Nfi$$

It is known that Nfi.Di=1 corresponds to the total degradation value of a failure state. Beforehand, during the modeling stage, all potential $(\Delta T, T)i$ are listed and the associated Nf is exported. It is this list of Nf, arranged in the form of an N×N matrix that is previously loaded into said microcontroller 23 that is functionally associated with the (temperature, humidity, internal signal, motion, etc.) sensors 122 functionally associated with the monitored equipment 3.

During operation of the aircraft 1, and thus of the equipment 3, the elapsed or consumed cycles derived from these measurements are enumerated and characterized. The associated amounts of deterioration (that are subsequently involved in defining "operating states") may then be estimated (step 49).

The accumulation of deterioration is modeled (e.g. step 48, FIG. 13) by using the Palmgren-Miner hypothesis. This hypothesis is also known as the "linear damage estimation rule". Each unit amount of damage Di results from external stress. The term "linear" is used because unit amounts of degradation add up. The ratio that results from this summing represents an estimate of the percentage (%) of the lifetime that has been consumed. When the sum reaches the value unity (100%=1), that constitutes a failure state, such that:

$$D_1 + D_2 + \ldots + D_{i-1} + D_i \geq 1 \Rightarrow \text{failure state} \quad (1)$$

The Palmgren-Miner hypothesis stipulates that each unit amount of damage is proportional to the number of times $n_i$ that a particular measured cycle is repeated. The Palmgren-Miner hypothesis stipulates that this unit amount of damage is inversely proportional to the number of times $N_i$ that it is necessary to repeat the cycle in order to reach failure. This is expressed by equation (2):

$$D_i = \frac{n_i}{N_i} \text{ such that} : \sum_i \frac{n_i}{N_i} \geq 1 \text{ in the event of failure} \quad (2)$$

The value $$\sum_i \frac{n_i}{N_i}$$

is the indicator about the health of the monitored subassembly (system 2, equipment 3, or component 4).

For an application that is demanding, as in the field of aviation, it is appropriate to take into consideration that the Palmgren-Miner hypothesis relies on certain approximations that the invention compensates or at least adjusts.

Thus, the Palmgren-Miner hypothesis does not take into account:
the chronological order in which stresses occur (commutativity of the rule); and
damage superposition phenomena.

However, on the basis of effective calibration during a modeling stage, the Palmgren-Miner hypothesis can provide a good approximation of the physical phenomena that appear while the aircraft 1 is in use (evaluated during a simulation step).

In conclusion, the various kinds of processing described above have made it possible to calculate an indicator about the health of a piece of equipment 3, as follows:

$$D_{Tot} = \sum_i \frac{n_i}{N_i} \quad (3)$$

Nevertheless, it should be observed that there are certain limitations in the prior art. In particular, the estimate of time to failure is not calculated in hours but gives rise merely to a damage state or damage ratio (without any physical unit).

Figure 13:
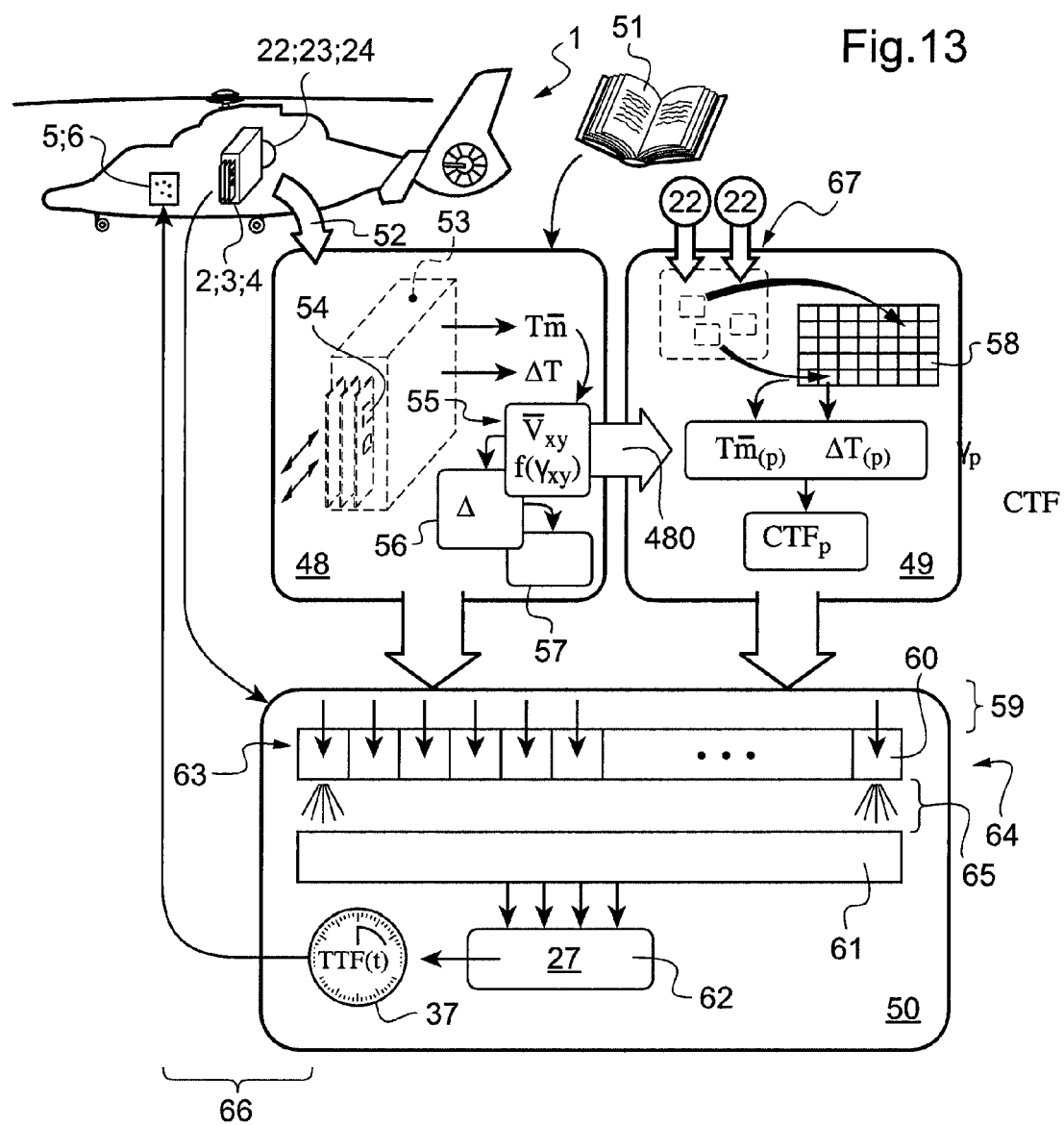
FIG. 13 is a functional diagram setting out the main physical elements, steps, and phases of processing in the method in accordance with the invention for predicting time to maintenance by fusing modeling and simulation for electronic equipment on board an aircraft.

Above equation (3) serves to convert the estimated damage ratio into a prognosis that is made available in terms of time. In order to go from a health indicator to an estimate of the remaining time to failure TTF(t) expressed in units of time (e.g. hours), the invention proposes using the value for the mean time before failure (MTBF) as supplied by the manufacturer of the equipment 3. This value typically forms part of documentation 51, as shown in FIG. 13. Depending on the implementation of the invention, this documentation 51 relies on the results of real tests, standards or specification data, or indeed the results of virtual damage modeling 53, e.g. during simulation 49.

A value for the remaining time to failure, written $DR_n$, may thus be estimated as follows:

$$DR_n = MTBF\left(1 - \sum_{i=1}^{n} \frac{n_i}{N_i}\right) \quad (4)$$

$$\sum_{i=1}^{n} \frac{n_i}{N_i} \geq 1$$

Where: $DR_n$ is the time to failure that remains at instant n. The matrix 58 of FIG. 6 shows the results of simulation.

From the values of Tm (also written $\overline{Tm}$) and ΔT, this matrix 58 makes it possible to write the following (step 48):
for the values (ΔT,T)=(45,45)→Nf1=CTF1=10830; and
for the values (ΔT,T)=(75,75)→Nf2=CTF2=1844.
This can be applied to Miner's rule, in the form:

$$Dt = 1/Nf1 + 1/Nf2$$

In the present state of the art, mismatches remain that make it impossible in practice to apply conventional damage evaluation theories in the field of aviation, in particular because:

the existing monitoring concept relies on evaluating the impacts of thermal cycles without taking account of the impact of, for example, vibration;

the results of monitoring rely essentially on theoretical results, so the estimated remaining lifetime may present a margin of error of as much as 50%; and monitoring does not make effective use of the results of accelerated testing (without using correlation algorithms).

Conversely, the solution provided by the invention proposes a prognosis and a structural implementation, e.g. using a sentinel device 24 (FIG. 11) suitable for integrating in the architecture (system 2, equipment 3, component 4) of an aircraft 1. Such a sentinel device 24 is also referred to as a built-in health monitor (BIHM).

Upstream from the invention, several theoretical approaches appear to be capable of making the prognosis reliable.

Firstly, it is the approach of external stress and damage superposition that is explored.

This is a theoretical approach based on evaluating the impact of vibration, humidity, and thermal cycling on the fastenings of components 4. The theoretical approach is based on the various actions (steps/phases/stages/processes) described above, further associated with taking effective account of the results of accelerated testing when constructing the matrix for prognosis calculation.

This theoretical approach may thus take account of the damage superposition that occurs as a result of simultaneous temperature and vibration stresses.

Secondly, the theoretical approach of prognosis by classifying measured signals is explored (i.e. PCSM in Table 1 above).

Measured signal classification in PCSM is based on identifying and observing electrical currents that are appropriate for monitoring. This is referred to as signal analysis. This so-called "signal-based" technique relies on observing internal signals that reveal the state of health of a piece of equipment 3.

The invention issues a prognosis by tracking trends in suitably selected intrinsic parameters in particular of a component 4 by using an integrated device 24. These parameters are representative of instantaneous values (of operating signals): drain electrical currents, intensity emitted by an optocoupler (e.g. one of the components 4), as explained below.

Figure 11:
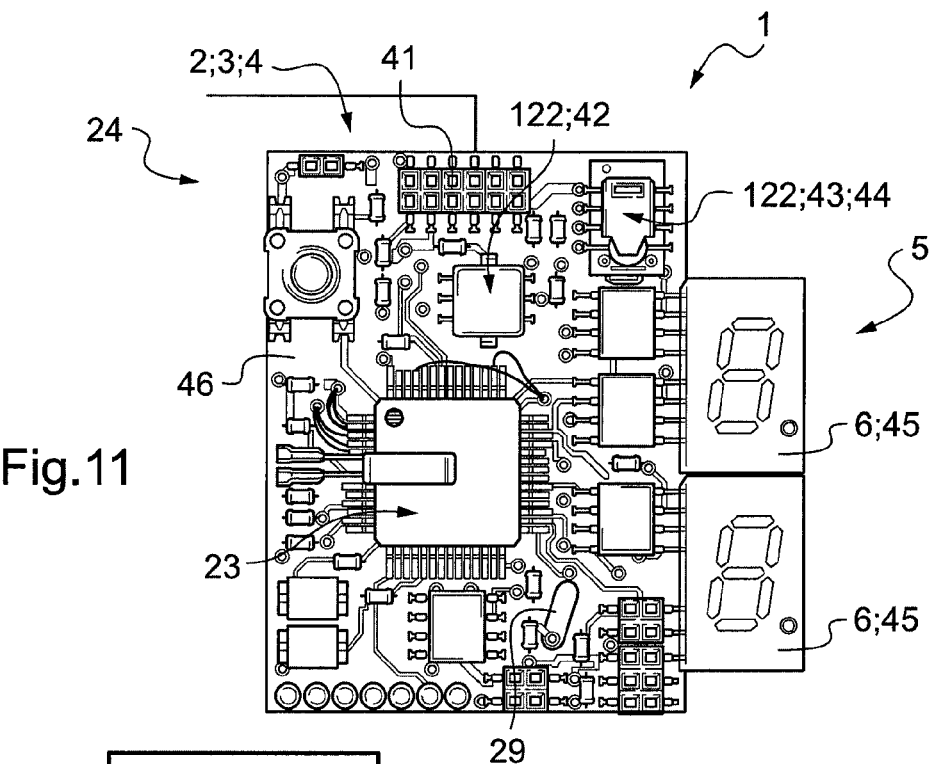
FIG. 11 is a diagram of a sentinel device in accordance with the invention for performing real-time calculation of a time-to-failure TTF(t) with at least: a microcontroller, connections for programming the microcontroller, a two-axis accelerometer, temperature and humidity sensors for measuring external signals, and two digital displays, all mounted on a printed circuit.

As in FIG. 8 or 11, the sensors 122 or probes 29 are integrated in the piece of equipment 3 of the aircraft 1 in order to measure these signal-based instantaneous values of operating signals. In a calculation unit 9, these parameter values are thus compared with thresholds that correspond to abnormal operation. Tracking trends in the values of these parameters or observing their approach to abnormal operating thresholds (failure state) makes it possible to perform a prognosis.

An illustration of such prognosis by classifying (cf. step 65, FIG. 13) measured signals (PCSM) is shown in FIG. 7. In FIG. 7, a graph shows the numerical values of measured signals, with the numerical values of a measured signal plotted up the ordinate and elapsed time along the abscissa. There can be seen a threshold line 25, a curve 26 tracking the trend, and moments or instants 27 at which a prognosis is made together with a failure forecast 28 (e.g. of a piece of equipment 3). A value for TTF(t) in units of time can be deduced therefrom.

Given the particularly draconian requirements in aviation, it has been found in practice that other approaches can be explored and used. That said, there now follows a description of the solution adopted by the invention, which provides for making an appropriate correlation between these two conventional approaches that are "signal-based" and that are "model-based", i.e. that rely on superposing external stresses and damage.

FIG. 8 shows a computer 9 in accordance with the invention and suitable for calculating the state of health of a subassembly (equipment 3/component 4) as a function of measured signal values (BIHM function) with inputs from sensors 122 and probes 29.

These two inputs are connected to two redundant chains 30 and 31.

One of the redundant chains 30 (upper chain receiving sensor signals 122) is a chain for prognosis by signal classification (PCSM). The other (lower chain, receiving probe signals 29) is a redundant chain 31 for combined external stresses.

Each redundant chain 30, 31 is tracked by a respective pre-prognosis logic block 32, 33. Selectors 34 and 35 for passing or interrupting signals are arranged respectively in the computer 9. In this example, a selector 34 is in line with the sensor 122, the chain 30, and the block 32. The selector 35 is in line with the probe 29, the chain 31, and the block 33.

Reference 36 constitutes a fusion (or merging) operator in accordance with the invention. In FIG. 8, it can be seen that the output from the fusion operator 36 delivers a prognosis result 37 for the TTF(t), which is, for example, made available to a pilot of the aircraft 1, via an interface 5 and its screen 6. This prognosis result 37 for the TTF(t) is distinct from its actual occurrence 27 (FIG. 7) and, by means of the invention, it is well adapted to the requirements of the aircraft 1.

This arises in particular from pre-prognosis steps, each of which is fed from a respective one of the redundant chains 30 and 31, followed by merging via the merging operator 36 in order to produce the final prognosis for the TTF(t), i.e. the result 37 in accordance with the invention.

It can already be understood that the invention correlates the partial results of the two above-mentioned theoretical approaches (the signal-based approach and the model-based approach, i.e. superposing external stresses and damage) in a specific manner. To make this work available in concrete form, it is essential for it to be integrated in the overall maintenance architecture. The calculation unit 9 (BIHM) is capable of performing a succession of steps of the invention enabling the prognosis 37 for the TTF(t) to be calculated.

This integration is subject to severe constraints in terms of reliability and security. It goes without saying that the reliability of the monitored system 2 must not be disturbed by integrating the device 24 that forms the monitoring sentinel. Integration takes account both of defining physical implantation in the maintenance architecture, and incorporating (e.g. by uploading) the monitoring sentinel device 24 in hardware, typically a component 4 or a piece of equipment 3.

It is possible to integrate the computer 9 (BIHM) in a component 4 (e.g. an SRU) and/or in computers 370 of systems 2 on board the aircraft 1 (e.g. the AMC maintenance computer).

These two possibilities are described with reference to FIGS. 9 and 10 respectively.

In FIG. 9, the computer 370 includes all of the structural elements including the dedicated calculation unit 9 and the software specific to calculating degradation, that are loaded in this computer 370 (AMC).

In FIG. 9, the example of maintenance architecture calculates the prognosis for the TTF(t) in a maintenance computer 370 (AMC) having signal measurement functions (α, γ, β) injected therein. For this purpose, the computer 370 is connected to various components 4, each of which is provided with one or more sensor(s) 122 and probe(s) 29 for measuring the respective values (α, γ, β) for sending to said computer 370 in the form of signals via connections 38.

Functions for defining the state of health of the various systems 2 taken in charge by the computer 370 are referenced 39.

These functions 39 lead to storage of meaningful health estimate results 37 of values for the TTF(t) of said components 4 and by extension of the piece(s) of equipment 3 and/or avionics system(s) 2 in which they are integrated.

In this example, the connections 38 transmit temperature and vibration measurements (α, γ, β) or currents under periodic triggering, each being sent from a component (SRU) 4 to the computer (AMC) 370. Thereafter damage is calculated within the computer 370. The results 37 for the TTF(t) can also be stored in a memory 8 (e.g. of the PCMCIA type) so as to be suitable for use in flight and/or on the ground.

An advantage of this embodiment (FIG. 9) lies in the fact that it is the manufacturer of the computer (AMC) 370 who centralizes the calculation algorithms used by the calculation unit (BIHM) 9: only a single update (typically a software update) is needed in the event of an anomaly.

Nevertheless, it should be observed that traceability of degradation history is made difficult. In the event of equipment being removed and replaced, a new piece of equipment 3 is considered by the computer (AMC) 370 as having a degradation history, even though it does not. At least on each occasion that a new piece of equipment 3 is installed, a new configuration needs to be loaded that takes account of the utilization history.

According to the invention, after a classification step (65), there is performed a data fusion step referenced 61 in FIG. 13. This classification (of intermediate modeling results, and of simulation results derived from them) presents various advantages. Including the advantage of combining the "model-based" and "signal-based" approaches without any external technical dependency on the manufacturer of the aircraft 1.

BIHM software specific to each component (SRU) 4 is loaded in the component (SRU) 4 itself, and degradation is evaluated within that particular component 4, or more generally in the piece of equipment 3 to which it belongs. This ensures that the history of degradations remains with the piece of equipment 3 if it is changed.

With reference now to FIG. 10, it can be seen that it is generally similar to FIG. 9.

Nevertheless, in this figure, the calculation units 9 for processing the signal measurement functions are integrated in the components 4 of the pieces of equipment 3 instead of being integrated in the maintenance computer 370 (as in FIG. 9).

FIG. 10 also shows a maintenance architecture in accordance with the invention. In this figure, each monitored component 4 is provided with a dedicated calculation unit (BIHM) 9, and it is the estimate signals, i.e. the primary assertions, as produced by each of these integrated calculation units 9 that are sent as signals via the connections 40 to the computer 370.

With reference to FIG. 11, there follows a description of an embodiment of a sentinel device 24 in accordance with the invention. The sentinel device 24 participates in real-time calculation of a time to failure (TTF) and in this example it possesses at least:

a microcontroller 23;

connections 41, e.g. for programming a microcontroller 23;

a sensor 122, in the form of a two-axis accelerometer 42;

other sensors 122, respectively a temperature sensor 43 and a humidity sensor 44 for measuring external signals (probe 29); and two digital displays 45, forming screens 6 of interfaces 5, with all of that mounted on a printed circuit 46.

In the sentinel device 42, the sensors 122 (42-44) thus measure physical parameters (environment signals) relating to the component 4 (or to its pieces of equipment 3 or indeed to the system 2 to which it belongs), and the probe(s) 29 measure(s) signals that are external to the components.

From a logical point of view, the sentinel device 24 performs a succession of processes, namely:

identifying a cycle;

reading the corresponding CTF from the matrix;

adding unit amounts of damage;

measuring critical intrinsic signals;

normalizing to 1;

using a data fusion algorithm; and recording the TTF(t) (i.e. the result).

It should be observed here that according to the invention the algorithm proceeds to calculate indicators, e.g. on the basis of equations such as:

$$TTF(t) = \frac{1-\overline{D}}{\overline{D}}t$$

$$TTF(t) = \frac{1 - \alpha_1 \frac{V_1(t)}{V_{max}} - \alpha_2 \sum_j \frac{n_j}{N_j}}{\alpha_1 \frac{V_1(t)}{V_{max}} + \alpha_2 \sum_j \frac{n_j}{N_j}}$$

A characteristic of the invention lies in two evaluations being taken into account simultaneously. The weighted mean is of two indicators of different kinds, but of a common origin: degradation of the component 4.

A given physical phenomenon may indeed give rise to different symptoms that can be observed by a variety of different types of measurement.

Assuming that any measurement retains a certain amount of error, taking a plurality of parameters into account helps minimize such error, by weighting each of the particular measurements by means of a coefficient $\alpha_i$.

If $\overline{D}$ is the mean of the degradation state, then:

$$\overline{D} = \sum_i \alpha_i D_i$$

When two methods are available for calculating degradation, the approach is subdivided into several steps:

defining parameters $V_1$ representative of a failure state (e.g. a drain voltage for a metal oxide on silicon field effect transistor (MOSFET) type component 4 that must not exceed a threshold value);

installing thresholds $V_{max}$;

measuring and recording the history of the signals $V_i$ during the life cycle;

$$D_1(t) = \frac{V_1(t)}{V_{max}}$$

in parallel, measuring the impact of external stresses using the approach described in detail above, with the result of this evaluation being $$D_2 = \sum_j \frac{n_j}{N_j}$$

the mean degradation is given by:

$$\overline{D} = \sum_i \alpha_i D_i$$

$$\overline{D} = \alpha_1 \frac{V_1(t)}{V_{max}} + \alpha_2 \sum_j \frac{n_j}{N_j}$$

$$\overline{D} = \alpha_1 D_1 + \alpha_2 D_2$$

The invention thus proposes a way of calculating (37) the mean time to failure TTF(t) in units of time:

For example, starting from:

$$TTF(t) = \frac{1-\overline{D}}{\overline{D}}t$$

$$TTF(t) = \frac{1 - \alpha_1 \frac{V_1(t)}{V_{max}} - \alpha_2 \sum_j \frac{n_j}{N_j}}{\alpha_1 \frac{V_1(t)}{V_{max}} + \alpha_2 \sum_j \frac{n_j}{N_j}} xt$$

if $$\alpha_1 = \alpha_2 = 1/2$$

then $$TTF(t) = \frac{2 - D_1 - D_2}{D_1 + D_2}t;$$

where:

$$D_1(t) = \frac{V_1(t)}{V_{max}}$$

and:

$$D_2 = \sum_j \frac{n_j}{N_j}$$

This result 37 of the calculation of the TTF(t) corresponds to the mean time to failure from the instant t occurring during the life cycle of the pieces of equipment 3. This result 37 takes account of two different calculation approaches and thus serves to diminish error on the step/phase 27 of calculating the prognosis for TTF(t), and remains more reliable than the results of either of the two approaches taken separately.

Figure 12:
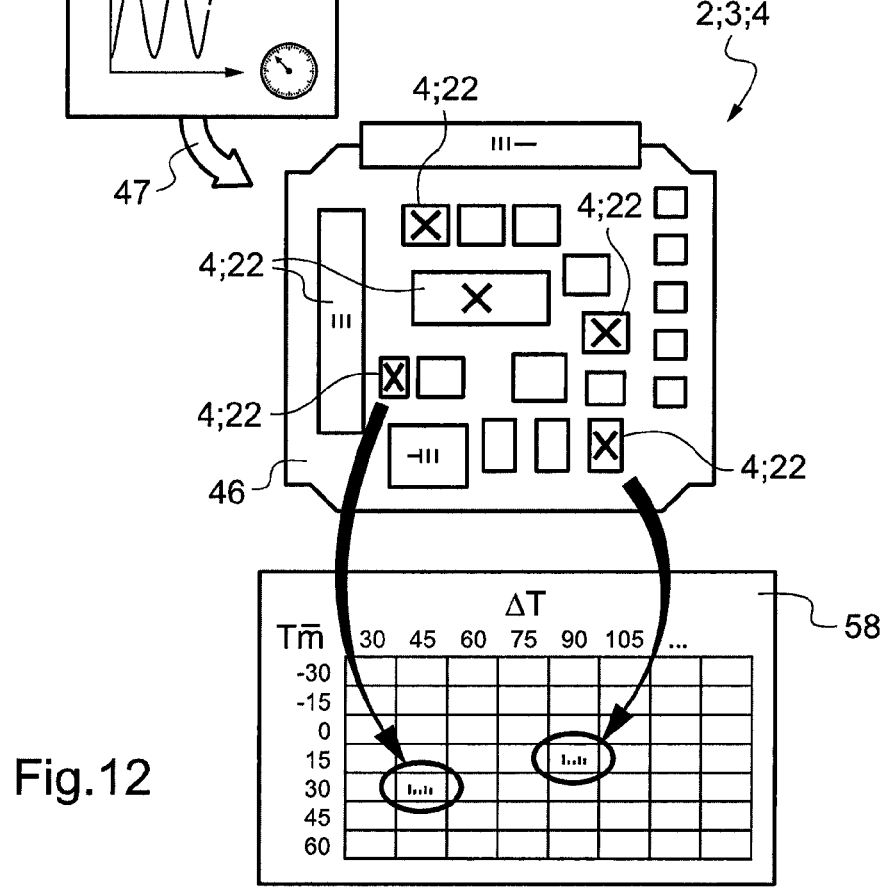
FIG. 12 is a diagram showing a simulation step for the purpose of making a prognosis of time to maintenance in accordance with an implementation of the invention, with injection of cyclic signals representing variation of an environment constraint into a model of equipment in the form of an electronics card having components on a printed circuit, this simulation step serving to identify certain components of the card that are not reliable, i.e. that are weak, in order to determine, as a function of said injected values of variation in an environmental constraint, unit items of information specific to said components, in particular in terms of a degradation indicator (Dt) and a number of cycles to failure (CTFp)

With reference now to FIG. 12, there follows a description of the step 49 of simulating a component 4. This step 49 is a prior step that seeks to produce information and data in order to provide a time to maintenance prognosis in accordance with an implementation of the invention.

This simulation (49) provides a phase 47 of injecting into a model of said component 4 (as evaluated during a prior step) cyclical signals representing variation of an environment constraint (here variation of the temperature T expressed in ° C. as a function of time).

The cyclical signals are thus injected at 47 into a model of the equipment 3 in the form of an electronic card having components 4 on a printed circuit 46. With reference to the example of FIG. 9, it can be understood that these signals 47 then enable the signals 38 to be produced. This seeks to determine whether the components 4 as evaluated in this way are reliable or not reliable, to point out or select certain components that constitute "weak links" in the equipment 3, and to extract certain useful data from these weak components 4.

In FIG. 12, five components 4 (marked with crosses "X") have been detected as being significantly weak or unreliable. These are thus marked "critical components" 22 of the card (piece of equipment 3) that are "not reliable", i.e. weak, and they have been located as a function of said injected values 47. In responses to these injected values 47 concerning variation in an environment constraint, unit information specific to each of the critical components 22 is also determined (i.e. for each of the marked components 4), in particular in terms of degradation indicators (Dt) and indicators of the number of cycles to failure (CTFp).

As an example of unit information specific to said critical components 22, reference may be made to FIG. 6 and to the paragraphs of the description that relates thereto.

That said, reference is made to FIG. 13, which is a schematic functional diagram for explaining the main physical elements, steps, and processing phases in an example of a time to maintenance prognosis method in accordance with the invention by fusion between modeling and simulation.

With reference to FIG. 13, there can be seen an implementation of this method of estimating the mean time to failure in time units for a piece of electronic equipment 3 on board an aircraft 1, the method being represented by its main steps.

At this stage, it is possible to summarize the running of the invention over a life cycle of the piece of equipment (3) by the following steps:

a modeling step (48) of modeling the equipment (3), said step (48) providing at least: a phase of parameterizing an aggression external to said equipment (3) and defining at least one physical parameter representative of said external aggression as a function of time; and a phase of producing a damage model (53) of the damage to the equipment (3) due to said external aggression;

a damage simulation step (49) of simulating the damage to the equipment (3) caused by repeated aggression in operation represented at least by said physical parameter, up to at least one failure state; said damage simulation step (49) comprising at least one stage of measuring values of said physical parameter during the repeated aggression, said measured values being integrated in said definition of said at least one physical parameter; and a stage (67) of selecting at least one critical component (22) within the equipment (3);

a data collection step (63) of collecting data specific to the damage to the equipment (3) from said damage model (53) and from measured values of said physical parameter in operation of the equipment (3);

a learning step (64), said learning step (64) providing at least: a phase of selecting at least one internal signal $V_i(t)$ of the equipment (3), said signal being determined as revealing a failure state of said at least one critical component (22); a phase of capturing operating data of the equipment (3); and a phase of generating a correlation function between said operating data (3) and values of said internal signal of said critical component (22) of said equipment (3);

a classification step (65) of classifying said internal signal values and said operating data; said classification step (65) including a phase of calculating and standardizing data representative of real distances to failure;

a fusion step (61) of fusing said data specific to damage and said data representative of real distances to failure once normalized, in order to obtain a real prognosis of the time to failure in units of time before maintenance; and a step (66) of making available said real prognosis of time to failure in units of time of the on-board electronic equipment.

Once this prognosis has been deduced, it may be displayed for example in the cockpit of the aircraft 1, on one or more screens 6.

In other words, an implementation of the invention may be described in that it provides:

a definition of one or more physical parameters representative of external aggression suffered by said electronic equipment 3 as a function of time;

modeling of unit amounts of damage for each physical parameter, in application of a damage superposition relationship;

measuring and recording said physical parameter(s) during the life cycle;

calculating unit amounts of damage for each physical parameter $$\frac{n_j}{N_j};$$

defining one or more internal signals $V_i(t)$ for said electronic equipment 3 indicative of a failure state;

determining an end of life threshold $V_{imax}$ for each internal signal;

measuring and recording said internal signal(s);

calculating a unit indicator $$\frac{V_i(t)}{V_{imax}}$$

for each internal signal as a function of the present value of said internal signal and of said determined threshold; and calculating the result 37 for a mean time to failure TTF(t) in units of time, e.g. using the following equation:

$$TTF(T) = \frac{1 - \alpha_1 \sum_i \frac{V_i(T)}{V_{imax}} - \alpha_2 \sum_j \frac{n_j}{N_j}}{\alpha_1 \sum_i \frac{V_i(T)}{V_{imax}} + \alpha_2 \sum_j \frac{n_j}{N_j}} xT \quad (1)$$

In FIG. 13, it can be seen that the definition of physical parameters is obtained both from documentation 51 specific to the aircraft 1, and also from data 52 or signals coming from the aircraft, in order to represent external aggression on said electronic equipment 3 for modeling (step 49).

Reference 53 designates the modeling (or virtual model) of one of the components of the pieces of equipment 3, and reference 54 designates the modeling (or virtual model) of the components 4, as performed during the modeling step 48.

This step 48 of modeling the unit amounts of damage for each physical parameter in application of a damage superposition relationship makes use for example of a physical model (e.g. a thermodynamic model for the values Tm and ΔT in FIG. 13).

These physical models 53 and 54 provide the parameters or values 55 for constraints and the effects of these constraint parameters on the equipment 3 as modeled in this way. From this there is deduced a unit value 56 representative of the effects produced by said constraints on the modeled equipment 53, i.e. a model for the damage to the equipment 3 inflicted by said external aggression parameter.

The computer 370 not only measures but also records, typically in memories 8, the physical parameters during the life cycle explored by the modeling 48. The value 57 for the number of cycles to failure (CTF) for the equipment 3 subjected to the modeled constraints is produced by this method at the end of or exiting the step 48.

There follows a calculation of the unit amounts of damage for each physical parameter $$\frac{n_j}{N_j}$$

and a simulation step 49 that is performed in part in parallel with the step 48, to define internal signals $V_i(t)$ of the equipment 3, which signals are representative of a failure state. These signals designate the components 4 that are weak (the marked components 4 in FIG. 12) by means of the matrix 58. An end-of-life threshold value $V_{imax}$ is determined for each internal signal.

The internal signals are measured and recorded. There follows the calculation of the unit indicator $$\frac{V_i(t)}{V_{imax}}$$

for each internal signal as a function of the present value of said internal signal and of said determined threshold.

Finally, it is possible in phase 27 to calculate the value 37 for the mean time to failure TTF(t) in units of time, e.g. using the above-mentioned equation.

Modeling step 48 thus includes applying a physical model (e.g. a thermodynamic model) to the equipment 3, together with values that provide the effects of stresses. By using a mathematical tool for resolution (e.g. resolution by finite elements or FEM), a value is derived for the damage that is proportional to the stress applied to the model 48. Thereafter, by applying the fatigue relationships to these results, e.g. the Coffin-Manson theorem, a value is obtained for the number of cycles before failure.

For example in FIG. 6, with ordinate temperature values Tm=45° C. and abscissa value ΔT=45° C., FEM gives the result Δγp=0.2 megapascals (MPa), which in application of Coffin-Manson relationships gives rise to: Nf=10830 cycles before failure.

Simulation step 49 is based on intermediate results (480) of the modeling 48, but with significant signals being injected, in order to determine (in particular using a matrix 58) components 4 that are marked as unreliable in each piece of equipment 3 under analysis. In this step 49, Coffin-Manson relationships and Miner rules are applied.

Collection, neuro-fuzzy classification, and fusion step 50 provides numerous advantages of the invention. In the signal-based approach, it is signals that are collected. Those of these signals that are said to be "significant" are analyzed relative to threshold values and by calculation they give a failure margin or distance from the failure state. The actual classification function is applied to the components 4 that are marked as being weak. As mentioned involved, this involves fuzzy logic. This step 50 operates in stages, as shown in FIG. 13.

The collection, neuro-fuzzy classification, and fusion step 50 produces an estimate of an instantaneous state for the equipment 3, when it is used on board the aircraft 1.

The modeling step 48 and the simulation step 49 produce data (signals) 59 for input into the step 50.

The step 63 collects data specific to unit amounts of on-board damage to the equipment in on-board operation on the basis of measuring and recording physical parameters representative of external aggression.

The "neuro-fuzzy" learning step 64, operates outside on-board operation or both outside and during on-board operation, to generate a correlation function between operating states (failures or good operation) and internal signals suitably selected in simulation step 49. Thus, thresholds concerning the internal signals are determined, thereby making it possible to correlate signal measurement with the state of the equipment.

This learning step 64 may for example make use of a neuro-fuzzy system that receives as input value pairs each comprising a state value and an internal signal measurement value, and that delivers as output from the learning phase the classification function in the form of classification threshold values.

In on-board operation, the classification step 65 uses the measurements of the internal signals and the classification function (correlation function) given in above-described step 64 to deliver and calculate significant data concerning real distances to failure.

By way of example, for each signal, this step determines the ratio of the present measurement of the signal divided by the threshold value as determined in step 64. This ratio gives a normalized distance between the current state of the equipment and a failure state.

Finally, a fusion step 61 gives the remaining time to failure. By way of example, the following function is used:

$$TTF(T) = \frac{1 - \alpha_1 \sum_i \frac{V_i(T)}{V_{imax}} - \alpha_2 \sum_j \frac{n_j}{N_j}}{\alpha_1 \sum_i \frac{V_i(T)}{V_{imax}} + \alpha_2 \sum_j \frac{n_j}{N_j}} xT$$

Finally, a step 66 for making the mean time to failure TTF(t) available delivers this time to the interfaces 5 (screens 6) of the aircraft 1. Other interface signals (sound, vibration, light, . . . ) may represent said mean time to failure TTF(t) in units of time, in specific implementations of the invention.

In an implementation, the invention provides for:

modeling unit amounts of damage under the effect of said physical parameter in application of a damage superposition relationship;

measuring and recording significant calculated values for the variation in unit amounts of damage under the effect of said physical parameter, during a predetermined life cycle of said equipment;

calculating unit amounts of damage for each physical parameter, in application of the principle:

$$\text{unit amount of damage} = \frac{n_j}{N_j}$$

defining at least one internal signal $V_i(t)$ for said electronic equipment representative of a failure state;

determining a time $V_{imax}$ to failure for each internal signal;

measuring and recording said internal signal;

calculating the unit indicator $V_i(t)/V_{imax}$ for each internal signal as a function of the present value of said internal signal and of said determined threshold; and calculating the remaining time to failure (TTF) of an on-board piece of electronic equipment, in units of time (T), using the equation:

$$TTF(T) = \frac{1 - \alpha_1 \sum_i \frac{V_i(T)}{V_{imax}} - \alpha_2 \sum_j \frac{n_j}{N_j}}{\alpha_1 \sum_i \frac{V_i(T)}{V_{imax}} + \alpha_2 \sum_j \frac{n_j}{N_j}} xT$$

To summarize, it is emphasized that in the field of structures and engines, wear phenomena (fatigue, corrosion, ...) are fairly easy to detect. In contrast, this does not apply to electronic systems. Measurable, pertinent, and accessible wear parameters are more rare.

As a result, until now, it has not been possible in practice to obtain a duration prognosis before maintenance for pieces of electronic equipment 3 on board an aircraft 1.

However such a prognosis is made possible by the invention and relies on a combination of two methods, i.e. modeling and simulation, with appropriate classification of the indicators they produce. The prognosis is capable of providing a reliable estimate in real time of the remaining time to failure TTF(t) of said equipment 3.

The first step makes use of physical parameters for external stresses (vibration, temperature, humidity, chemical aggression, ...) for monitoring electronic components 4.

The second step relies on suitably selected internal signals that are representative of the state of health of the electronic components 4 of the equipment 3, such as for example a drain current or a light intensity emitted by an optocoupler.

It is indeed known to make use of physical parameters. It is also known to make use of flight parameters, of performance parameters, and of autotest data. However selecting an internal signal of the drain current type or of the light emitted by an optocoupler type is original.

The novel combination of these two steps, together with the fusion of the data they produce, is advantageous since the steps are complementary. They enable the diagnosis of remaining times of failure for a piece of equipment 3 to be refined and made more reliable and they stem from physical analysis work relating to damage to electronic equipment that has been carried out by the Applicant.

Various advantages stem from a prognosis function in accordance with the invention as applied to avionics systems 2. In particular it makes the following possible:

avoiding interrupting a mission due to a non-programmed maintenance operation;

giving an image of the overall health of the systems 2 of the aircraft 1 at any given moment;

anticipating maintenance actions and the associated logistics, such as proper management of stocks of spare parts and the like; and in the military field, improving the degree of confidence that can be given to the systems 2 in order to accomplish a mission.

Certain doubts may lie in the degree of reliability of existing sensors 122, that are suitable for being integrated in the avionics architecture. Research may encounter a need to obtain a certain number of inputs from manufacturers who have knowledge of the operation of each piece of equipment 3.

Naturally, the invention is not limited to the implementations described and shown. The invention naturally applies to implementations that are equivalent to those of the present application and it is not physically possible to describe each variant in detail.

What is claimed is:

1. An avionics system including at least one piece of on-board electronic equipment suitable for submitting a technical prognosis concerning said equipment's mean time to failure (TTF(t)) in time units, wherein the avionics system includes a connection to an expert station on the ground, said on-board electronic equipment possessing a plurality of components and at least one sentinel device that participates in the real time calculation of said time to failure in units of time, said sentinel device having on a printed circuit at least: a microcontroller; connections to the microcontroller; a sensor in the form of an accelerometer; and another sensor for measuring external signals; said prognosis executing the following steps:

a modeling step of modeling the equipment, said step providing at least: a phase of parameterizing an aggression external to said equipment with defining at least one physical parameter reflecting this external aggression as a function of time; and a phase of producing a damage model of the damage to the equipment due to said external aggression;

a damage simulation step of simulating the damage to the equipment caused by repeated aggression in operation represented at least by said physical parameter, up to at least one failure state; said damage simulation step comprising at least one stage of measuring values of said physical parameter during the repeated aggression, said measured values being integrated in said definition of said at least one physical parameter; and a stage of selecting at least one critical component within the equipment;

a data collection step of collecting data specific to the damage to the equipment from said damage model and from measured values of said physical parameter in operation of the equipment;

a learning step, said learning step providing at least: a phase of selecting at least one internal signal $V_i(t)$ of the equipment, said signal being determined as revealing a failure state of said at least one critical component; a phase of capturing operating data of the equipment; and a phase of generating a correlation function between said operating data and values of said internal signal of said critical component of said equipment;

a classification step of classifying said internal signal values and said operating data; said classification step including a phase of calculating and standardizing data representative of real distances to failure;

a fusion step of fusing said data specific to damage and said data representative of real distances to failure once normalized, in order to obtain a real prognosis of the time to failure in units of time before maintenance; and a step of making available to said expert station on the ground, said real prognosis of time to failure in units of time of the on-board electronic equipment.

2. A technical prognosis method for making a prognosis available on an expert station on the ground about the mean time to failure (TTF(t)) in units of time of at least one piece of electronic equipment on board an aircraft; said equipment possessing a plurality of components, wherein, during a life cycle of the equipment the method comprises the following steps:
- a modeling step of modeling the equipment by a processor, said step providing at least: a phase of parameterizing an aggression external to said equipment and defining at least one physical parameter representative of said external aggression as a function of time; and a phase of producing a damage model of the damage to the equipment due to said external aggression;
- a damage simulation step of simulating the damage to the equipment caused by repeated aggression in operation represented at least by said physical parameter, up to at least one failure state; said damage simulation step comprising at least one stage of measuring values of said physical parameter during the repeated aggression, said measured values being integrated in said definition of said at least one physical parameter; and a stage of selecting at least one critical component within the equipment;
- a data collection step of collecting data specific to the damage to the equipment from said damage model and from measured values of said physical parameter in operation of the equipment;
- a learning step, said learning step providing at least: a phase of selecting at least one internal signal $V_i(t)$ of the equipment, said signal being determined as revealing a failure state of said at least one critical component; a phase of capturing operating data of the equipment; and a phase of generating a correlation function between said operating data and values of said internal signal of said critical component of said equipment;
- a classification step of classifying said internal signal values and said operating data; said classification step including a phase of calculating and standardizing data representative of real distances to failure;
- a fusion step of fusing said data specific to damage and said data representative of real distances to failure once normalized, in order to obtain a real prognosis of the time to failure in units of time before maintenance; and
- a step of making available to said expert station on the ground, said real prognosis of time to failure in units of time of the on-board electronic equipment.

3. A technical prognosis method according to claim 2, wherein the collection step groups together data specific to unit amounts of damage for each physical parameter in application of a damage superposition rule.

4. A technical prognosis method according to claim 3, wherein the collection step provides:
processing to identify a cycle;
processing to read a number of cycles from a matrix coming from the modeling step; and
processing to add unit amounts of damage using equation:

$$\sum_j \frac{n_j}{N_j}$$

where: $n_j$ designates the repetition number of a cycle constituting a source of damage to which the equipment has been subjected, and $N_j$ designates a predetermined number of repetitions of said damage-source cycle capable of leading to a failure state.

5. A technical prognosis method according to claim 2, wherein the learning step determines a failure threshold $V_{imax}$ for each internal signal $V_i(t)$ of said equipment.

6. A technical prognosis method according to claim 5, wherein the method provides for the classification step to determine data representative of real distances to failure defined by $$\frac{V_i(t)}{V_{imax}}$$

for each internal signal $V_i(t)$ of said equipment as a function of an instantaneous value of said internal signal and of said determined threshold.

7. A technical prognosis method according to claim 6, wherein the fusion step calculates said time before maintenance in the form of a mean time to failure TTF(t) in units of time on the basis of the following equation:

$$TTF(T) = \frac{1 - \alpha_1 \sum_i \frac{V_i(T)}{V_{imax}} - \alpha_2 \sum_j \frac{n_j}{N_j}}{\alpha_1 \sum_i \frac{V_i(T)}{V_{imax}} + \alpha_2 \sum_j \frac{n_j}{N_j}} xT$$

where $\alpha_1$ and $\alpha_2$ are two constant coefficients having a sum of 1.

8. A technical prognosis method according to claim 2, wherein, during the parameterizing phase, said physical parameter takes account at least of one level of vibration to which the equipment is subjected.

9. An aircraft enabling a technical prognosis method for making a prognosis available on an expert station on the ground about the mean time to failure (TTF(t)) in units of time of at least one piece of electronic equipment on board an aircraft; said equipment possessing a plurality of components, wherein, during a life cycle of the equipment the method comprises the following steps:
- a modeling step of modeling the equipment by a processor said step providing at least: a phase of parameterizing an aggression external to said equipment and defining at least one physical parameter representative of said external aggression as a function of time; and a phase of producing a damage model of the damage to the equipment due to said external aggression;
- a damage simulation step of simulating the damage to the equipment caused by repeated aggression in operation represented at least by said physical parameter, up to at least one failure state; said damage simulation step comprising at least one stage of measuring values of said physical parameter during the repeated aggression, said measured values being integrated in said definition of said at least one physical parameter; and a stage of selecting at least one critical component within the equipment;
- a data collection step of collecting data specific to the damage to the equipment from said damage model and from measured values of said physical parameter in operation of the equipment;
- a learning step, said learning step providing at least: a phase of selecting at least one internal signal Vi(t) of the equipment, said signal being determined as revealing a failure state of said at least one critical component; a phase of capturing operating data of the equipment; and a phase of generating a correlation function between said operating data and values of said internal signal of said critical component of said equipment;

a classification step of classifying said internal signal values and said operating data; said classification step including a phase of calculating and standardizing data representative of real distances to failure;

a fusion step of fusing said data specific to damage and said data representative of real distances to failure once normalized, in order to obtain a real prognosis of the time to failure in units of time before maintenance; and a step of making available to said expert station on the ground, said real prognosis of time to failure in units of time of the on-board electronic equipment, wherein the aircraft is a rotary wing aircraft.

10. An aircraft according to claim 9, including at least one avionics system having at least one on-board piece of electronic equipment provided with at least one sentinel device suitable for submitting in real time to said prognosis a time to failure in units of time; the sentinel device being connected to at least one probe of the aircraft that is suitable for measuring internal signals of at least one component of said piece of equipment; said sentinel device comprising a printed circuit carrying at least:

a microcontroller;
connections to the microcontroller;
a sensor in the form of an accelerometer;
at least one other sensor for measuring external signals; and
a digital display.

* * * * *